(12) United States Patent
Jansen op de Haar (10) Patent No.: US 9,489,363 B2
(45) Date of Patent: Nov. 8, 2016

(54) USER CONFIGURABLE USER INTERFACE

(71) Applicant: Rob Jansen op de Haar, Scottsdale, AZ (US)

(72) Inventor: Rob Jansen op de Haar, Scottsdale, AZ (US)

(73) Assignee: SAP SE, Walldorf (DE)

( * ) Notice: Subject to any disclaimer, the term of this patent is extended or adjusted under 35 U.S.C. 154(b) by 268 days.

(21) Appl. No.: 14/315,275

(22) Filed: Jun. 25, 2014

(65) Prior Publication Data

US 2015/0378573 A1 Dec. 31, 2015

(51) Int. Cl.
 *G06F 15/00* (2006.01)
 *G06F 13/00* (2006.01)
 *G06F 17/24* (2006.01)
 *G06Q 10/06* (2012.01)

(52) U.S. Cl.
 CPC ............ *G06F 17/243* (2013.01); *G06Q 10/06* (2013.01)

(58) Field of Classification Search
 CPC .............................. G06F 3/0484; G06F 3/048
 USPC ......................... 715/747, 716, 764, 838, 792
 See application file for complete search history.

(56) References Cited

U.S. PATENT DOCUMENTS

| | | | |
|---|---|---|---|
| 4,926,349 A | 5/1990 | Thor | |
| 7,398,473 B2 | 7/2008 | Stoner et al. | |
| 7,418,696 B2 | 8/2008 | Hawley et al. | |
| 8,370,757 B2 | 2/2013 | Tinari et al. | |
| 8,560,576 B2 * | 10/2013 | Kernke | G06F 17/248 707/803 |
| 8,645,228 B2 | 2/2014 | Moussa et al. | |
| 2006/0031811 A1 * | 2/2006 | Ernst | G06F 17/30607 717/100 |
| 2006/0149751 A1 | 7/2006 | Jade et al. | |
| 2008/0155518 A1 * | 6/2008 | Van Wyk | G06Q 10/06 717/142 |
| 2011/0040390 A1 * | 2/2011 | Blevins | G05B 19/0426 700/18 |

OTHER PUBLICATIONS

"OpManager User Guide," Zoho Corporation Pvt. Ltd, 2013, 261 pages.
"Thomson Innovation Training Manual," Thomson Reuters, 2013, 46 pages.

* cited by examiner

*Primary Examiner* — Kevin Nguyen
(74) *Attorney, Agent, or Firm* — Brake Hughes Bellermann LLP (57) ABSTRACT

A system for data entry includes a form module, where the form module includes at least one form having multiple fields and the form module is configured to receive data into the fields. Each of the fields is user selectable to set a default value and each of the fields is user selectable for removal from display in a form view. The system includes a default value module, where the default value module includes a default value list, which includes the user selected fields having both a default value and user selected for removal from display in the form view. The system includes a display module that is configured to display the form view, where the form view displays the fields for data entry and collapses the list of displayed fields to remove the fields on the default value list from display in the form view.

19 Claims, 6 Drawing Sheets

| Defaults | |
|---|---|
| xyz | |
| < Field N | Field n's value |
| < Field N | Field n's value |
| < Field N | Field n's value |
| < Field N | Field n's value |
| < Field N | Field n's value |
| < Field N | Field n's value |

USER CONFIGURABLE USER INTERFACE

TECHNICAL FIELD

This description relates to a user configurable user interface.

BACKGROUND

Entry of data into an application or into a database by a user can be a time-consuming and tedious process. The user may have to navigate multiple screens and numerous data fields to enter a single record into the application or into the database. It may be desirable to make the data entry process more user friendly.

SUMMARY

According to one general aspect, a system for data entry includes a form module, where the form module includes at least one form having multiple fields and the form module is configured to receive data into the fields. Each of the fields is user selectable to set a default value and each of the fields is user selectable for removal from display in a form view. The system includes a default value module, where the default value module includes a default value list, which includes the user selected fields having both a default value and user selected for removal from display in the form view. The system includes a display module that is configured to display the form view, where the form view displays the fields for data entry and collapses the list of displayed fields to remove the fields on the default value list from display in the form view.

In another general aspect, a computer-implemented method for executing instructions stored on a non-transitory computer readable storage medium includes generating a form view and displaying the form view to a user, where the form view includes a form having multiple fields, where each of the fields is user selectable to set a default value and each of the fields is user selectable for removal from display in the form view to a default value list. The method includes removing from display in the form view one or more user selected fields having both a default value and a user selection to be removed from the form view to the default value list and collapsing a list of the displayed fields on the form view upon removal of the user selected fields from the form view to the default value list.

The details of one or more implementations are set forth in the accompanying drawings and the description below. Other features will be apparent from the description and drawings, and from the claims.

DETAILED DESCRIPTION

This document describes systems and techniques for enabling a user configurable user interface. In one example implementation, a user interface may be configured by a user to simplify an otherwise complicated user interface. For example, fields in the user interface may be set to default values and hidden from view. In a similar manner, fields that have been set to a default value and hidden from view may be un-hidden and returned to a view visible to the user. In this manner for a data entry implementation, multiple fields across multiple screens may be reduced to a single screen for data entry. The time required for data entry may be reduced by enabling the user interface to be user configurable in the manner described in this document.

In one example implementation, the user may save the user configured user interface as a template, where the template includes the fields designated by the user as having default values and being hidden from view on a data entry form. Each saved template may be reused and each saved template can be modified or re-configured by the user and re-saved as a new template. In this manner, the template saves the user-set fields having default values and being designated as hidden from view, making it easier for the user to set just the minimum number of fields that may need data entry from project to project.

Figure 1:
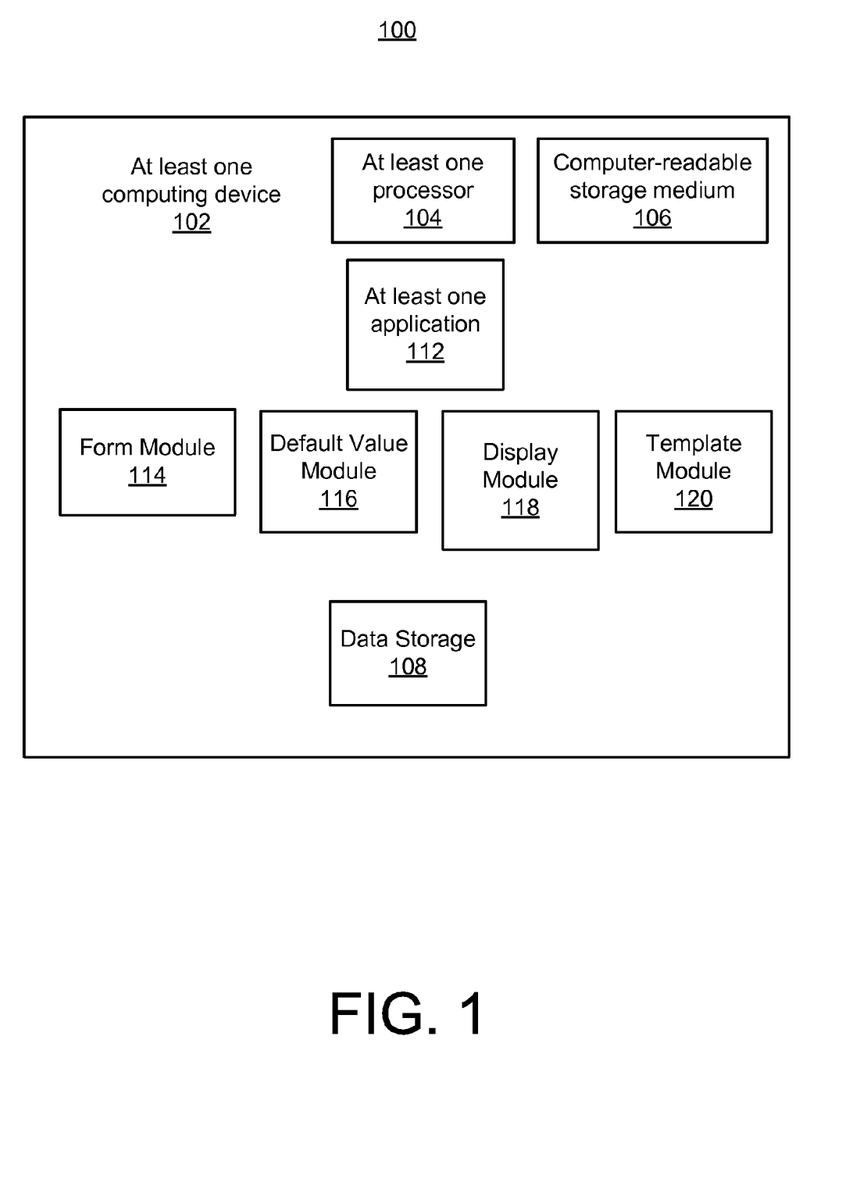
FIG. 1 is a block diagram of a system for a user configurable user interface.

FIG. 1 is a block diagram of a system 100 for a user configurable user interface. The system 100 is illustrated as being executed by at least one computing device 102, which is illustrated as including at least one processor 104 and at least one non-transitory computer-readable storage medium 106. The computing device 102 may host the system 100, where the computing device 102 may be a server, including a blade server, web server, application server or other computing device capable of hosting such a system 100. The computing device 102 may include multiple computing devices, such as multiple servers, that are operably coupled and configured to host the system 100 across the multiple computing devices.

The computing device 102 may be networked to other computing devices (not shown) such that the systems on the computing device 102 may send and receive information across a network (not shown), such as the Internet, a wide area network and/or a local area network. In one example implementation, the computing device 102 may provide the applications and services and functionality to other computing devices (not shown) that are arranged in a server-client relationship, with the computing device 102 acting as the server and the other computing devices acting as clients to access and use the functionality of the applications and services on the computing device 102.

The at least one processor 104 may represent two or more processors executing in parallel, and the non-transitory computer-readable storage medium 106 may represent virtually any non-transitory medium that may be used to store instructions for executing processor 104, and related data. Multiple processors also may be referred to as multi-core processors or multi-processor core environment. Further, the at least one computing device 102 may represent two or more computing devices, which may be in communication with one another.

The system 100 includes data storage 108. The data storage 108 may be a non-volatile memory or other type of memory that is configured to store large amounts of data. The data storage 108 may include non-volatile memory such as, for example, flash memory. The data storage 108 also may include volatile memory such as, for example, random access memory (RAM). The data storage 108 may be configured to store data. Data may be written to and read from the data storage 108 under the control and processing of the at least one processor 104.

The system 100 includes at least one application 112. The application 112 may be a computer program that is configured to work in cooperation with the other components and modules illustrated in FIG. 1. The application 112 may be programmed to provide a user interface that is user configurable, as described in this document. For example, the application 112 may be an application that includes one or more modules for data entry on a user configurable user interface. The application 112 may interface with the processor 104, the computer-readable storage medium 106 and the data storage 108 to receive and store data, which may be entered for storage and processing by a user using the application.

The system 100 may include a form module 114, a default value module 116, a display module 118 and a template module 120. In one implementation, the form module 114, the default value module 116, the display module 118 and the template module 120 may be a part of the application 112 and/or may work in conjunction with the application 112. The form module 114, the default value module 116, the display module 118 and the template module 120 may work together to enable a user to configure a user interface, including one or more different views of the interface, to accomplish one or more tasks, such as data entry into the application 112 for data processing and data storage.

More specifically, the form module 114, the default value module 116, the display module 118 and the template module 120 enable the user to configure which fields are presented on the user interface, which fields have default values set and which fields are hidden from the main user interface screen. In this manner, the user can remove the fields that do not change or that have default values set from view or at least from a main user interface so that only the fields that need values input are on the user interface. This enables the user to decide the manner in which to simplify the user interface. Also, the user can save a configured user interface as a template, where the template may be re-used and also modified and re-saved as a new template. Below, the form module 114, the default value module 116, the display module 118 and the template module 120 are discussed in more detail.

The form module 114, using the at least one processor 104, may generate one or more forms for display using the display module 118 on a user interface. A form may include multiple fields. A user may enter data in the fields for saving the data into the data storage 108 and for processing by the application 112 and processor 104. That is, the fields may be configured to receive data input by the user.

Figure 3:
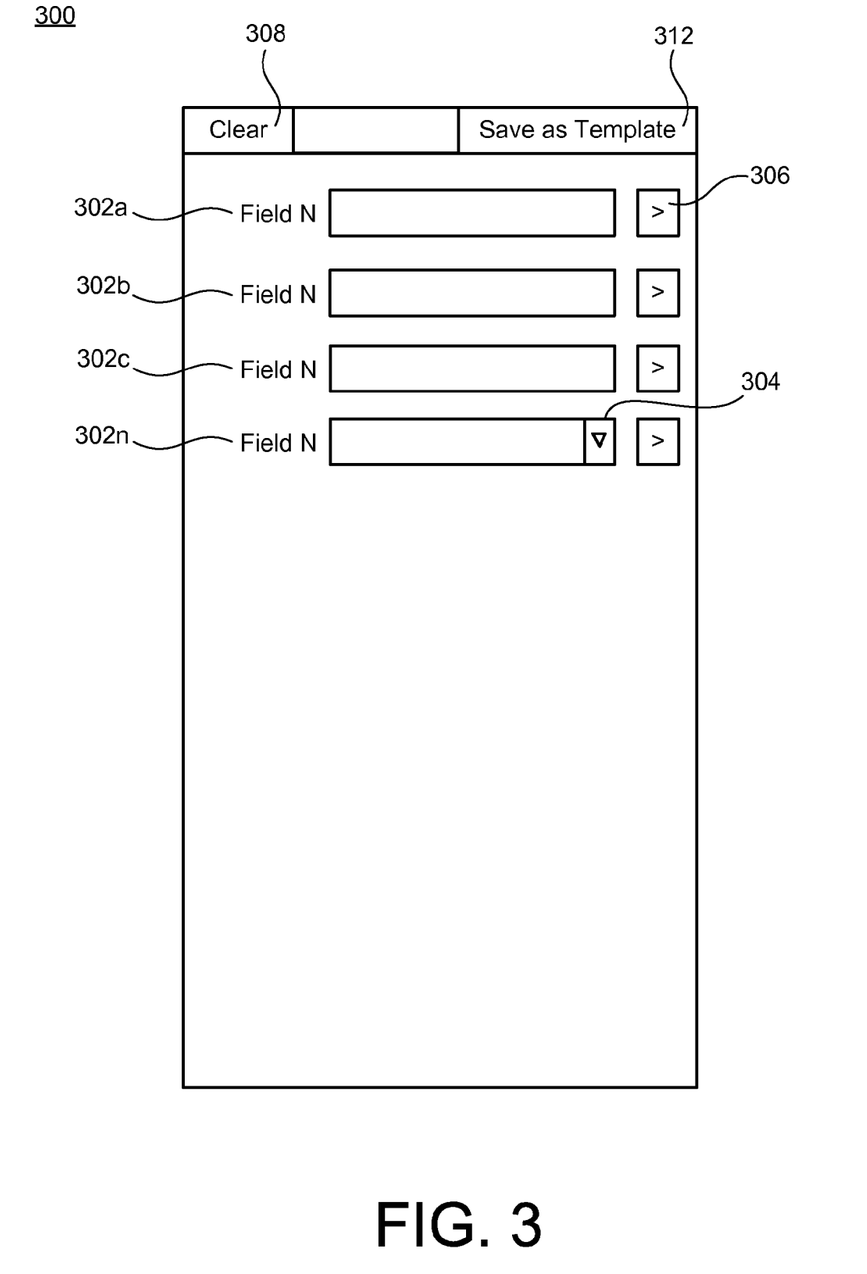
FIG. 3 is an exemplary screen shot illustrating a form view of a user configurable user interface.

Referring also to FIG. 3, an exemplary screen shot 300 illustrates a form view that is part of the user configurable user interface. The form module 114 may generate the form view for display by the display module 118. As discussed above, the form view includes multiple fields 302a-302n. The fields 302a-302n are configured to receive values entered by a user and to save the values in the data storage 108 for use by the application 112. The fields 302a-302n may be different types of fields and may be labelled to identify the type of information and/or the type of values to be entered into the field. The fields 302a-302n may be configured to receive different types of values including alpha-numeric characters as well as other types of values and information.

In one example implementation, the form view is a data entry view or a data entry screen that the user uses to enter data into the form view. It may be desirable for ease of data entry to allow the user to select the fields for display in the form view and to designate or select other fields as having default values, which may be removed or hidden from the form or data entry view.

In some implementations, a user may choose a value to enter in one of the fields from a selected list of values. For example, field 302n includes a drop down menu 304, which, when selected, provides a list of values from which the user may select to populate the field 302n.

In some implementations, the user may set a value in a field as designate it as a default value. For example, each of the fields 302a-302n may be configurable for the user to set the field with a default value. Each of the fields 302a-302n are user selectable for entry of a default value. In this manner, for situations where the value of the field may remain constant across multiple forms, the user may set the value as a default value so that the user doesn't need to keep re-entering the value each time a new form with the fields is being filled out.

Furthermore, each of the fields 302a-302n may be user selectable for removal from the form view. For example, the user may select one or more of the fields 302a-302n or all of the fields 302a-302n for removal from the form view. In one implementation a selector, such as selector 306, may be used to remove the field from the form view. Upon selection of the selector 306, the field 302a would be removed from display in the form view. Each of the fields 302a-302n may include such a selector. In other implementations, other user manipulations or other types of selectors may be used to select the field for removal from the form view, including a drag and drop implementation. When the field is removed (or hidden) from the form view, the field may be moved to or displayed on another view, including the default value list in a default value view, as described in more detail below.

When a field is designated for removal from the form view, the other surrounding fields that remain in the form view may be configured to collapse the list of displayed fields to use the space vacated by the removed field. The display module 118 may be configured to display the form view and the display module 118 may be configured to remove the fields selected by the user for removal from the form view and to collapse the list of the remaining fields.

The fields may be collapsed vertically and/or horizontally and groups of fields may be removed or hidden from the form view. The form view may have groups of fields of which fields may be individually moved to a corresponding default view, such as the default value list described below. The remaining fields in a groups would collapse but would not affect the fields in other groups. The total amount of space used by the fields in the form view would be reduced.

To illustrate the collapse of the fields when one is removed, suppose a user selects field 302b for removal from the form view. When the display module 118 removes the field 302b from display in the form view, the remaining fields 302c-302n may move up in the list to take up the space previously occupied by the field 302b. It also may be that if other fields are removed from the middle of the list, that the fields collapse by the fields above the removed field moving down and the fields below the removed field moving up. In this manner, the remaining fields, 302a and 302c-302n will use less screen real estate on a display. This also makes data entry by the user easier by removing fields that do not require entry or that have a default value set, as discussed below.

In a similar manner, fields that have been removed from display in the form view, may be selected by the user to be un-hidden or displayed again in the form view. The user may control when to select a field to be moved back into the display on the form view. In one implementation, the ordering of the fields is retained when fields are removed from the form view and later brought back into view on the form view. In this manner, the context of the hidden fields on the form view is retained if the fields are later un-hidden and re-displayed on the form view.

In one implementation, the fields 302a-302n may be user set to have a default value and user set for removal from the form view. The form module 114 may be configured to enable the fields to be user selectable to set a default value and to be user selectable for removal from display in the form view. As discussed above, these fields having a set default value and removed from the form view may cause the remaining fields to collapse and take up any space previously occupied by the now removed fields.

The form view also includes other features as illustrated in FIG. 3. For example, the form view may include a clear selector 308 and save as template selector 312. The clear selector 308 may be selectable by the user and when selected cause the clearing of all values, other than default values, from the fields 302a-302n in the form view. The save as template selector 312 may be user selectable and when selected save the form view, as currently displayed, as a template for re-use and later modification. The save as template selector 312 also saves any default values for fields, including default values for fields designated for removal from the form view, as discussed in more detail below with respect to the template module 120.

Figure 4:
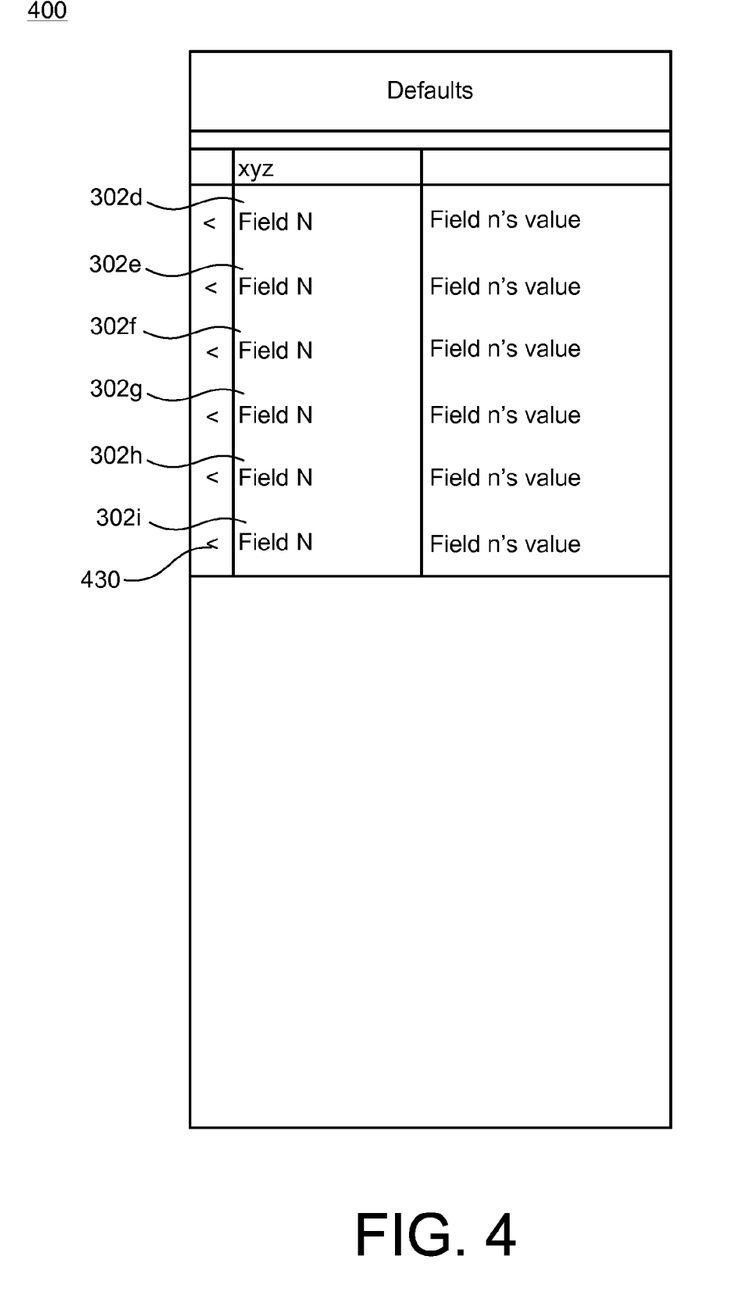
FIG. 4 is an exemplary screen shot illustrating a default value list of a user configurable user interface.

The default value module 116 may be configured to include a default value list, which is illustrated in a default value view. The default value list includes the user selected fields having both a default value and user selected for removal from display in the form view. Referring also to FIG. 4, an exemplary screen shot 400 illustrates an example default value list in a default value view. The default value list is a list of fields that have default values set and that have been removed from display in the form view by the user. For example, the default value list in the screen shot 400 of FIG. 4 illustrates fields 302d-302i, which have had default values set and which have been removed from view or display in the form view. Each of the fields may include a label and a value, as discussed above with respect to the fields of FIG. 3.

Figure 6:
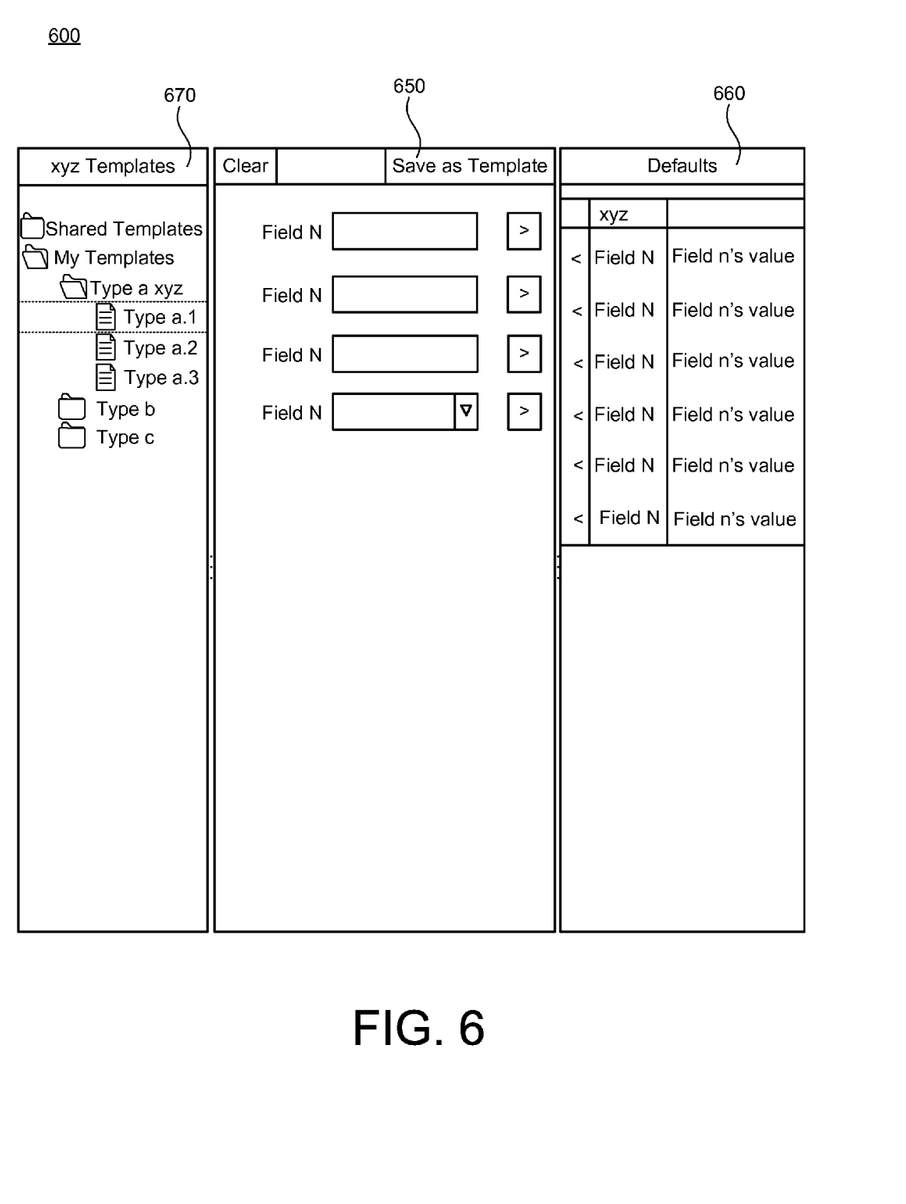
FIG. 6 is an exemplary screen shot illustrating a form view, a default value list and a template list of a user configurable user interface.

The display module 118 may display the default value list in the default value view. The display module 118 may display the default value list in the default value view on a separate screen or on a same screen as the form view. Referring for example to FIG. 6, an exemplary screen shot 600 illustrates a display having both a form view 650 and a default value view 660 on a single display. In other implementations, such as on a mobile computing device where screen real estate is more limited, a user may be able to swipe between different views on the display screen including the form view and the default value list.

In this manner, the user can see the fields that are on the form view 650, which might indicate those fields that require the user to set a value for completion of the data entry and to see those fields that are on the default value view 660, which do not require the entry of a value. The default value remains constant and the fields in the form view may be changed and variable.

Referring back to FIG. 4, in one implementation, the selection of a field for removal from the form view and for inclusion on the default value list sets the value in the field as the default value. This default value will continue to be applied to all completed data entry forms.

In one implementation, each of the fields 302d-302i on the default value list may include a selector 430. The selector 430 is user selectable and when selected causes the field to be returned to the form view and to be removed from the default value list. In one implementation, the fields returned to the form view may be inserted in a same place they originally occupied in the form view. In other implementations, the user may select where in the form view the field should be returned to. In other implementations, other types of selectors or user manipulations may be used, including drag and drop, to remove the field from the default value list and to return it to the form view.

In some implementations, the form module 114 may generate a form view that includes fields that are displayed on multiple screens (or windows) of a display by the display module 118. When the fields 302a-302n extend across multiple screens, the user may have to navigate between the multiple screens to enter the values into the fields 302a-302n. The user configurability of the user interface of the form view and the default value list enables the user to reduce the number of screens needed for data entry. For instance, the user may set default values and hide those fields from view in the form view, which causes the collapse of the space used by that field in the form view and may reduce the overall number of screens needed for data entry. In some examples, the user may reduce the number of screens for the form view down to a single screen.

The template module 120 is configured to use the processor 104 to save the form view as a template. The saved template includes both the form view and the default value list. In this manner, for example, a user entering data that uses the same set of fields and the same default value fields may use the saved templates to make the data entry easier instead of starting from the beginning with all fields displayed in the form view without any default values. The template module 120 allows the user to save an unlimited amount of templates and to name the saved templates in any manner desired.

Figure 5:
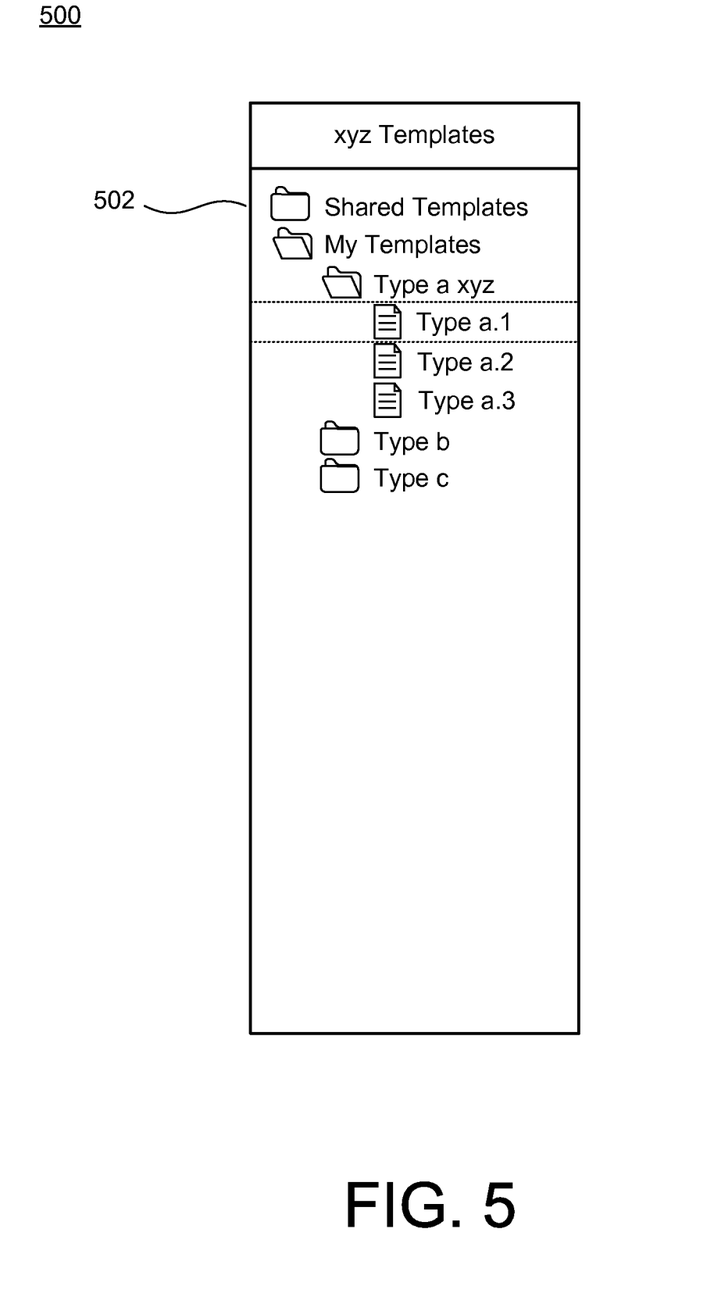
FIG. 5 is an exemplary screen shot illustrating a template list of a user configurable user interface.

Referring to FIG. 5, an example screen shot 500 illustrates a list 502 of saved templates. The saved template may be re-opened and used for data entry by the user. The saved template also may be opened and modified by the user and saved as a new template in the list 502. The user also may re-save a modified template using the same name such that the existing template definition would be overwritten with the new definition.

The screen shot 500 also illustrates that the saved templates may be saved for personal use and/or for sharing with others by using different folders in which to save the templates, where the folders may include different access rights in order to share with others or to keep as templates accessible only by the user.

Referring also to FIG. 6, the screen shot 600 illustrates the template view 670 on the same screen as the form view 650 and the default value view 660. As discussed above, in a mobile computing device implementation, the form view, the default value view 660 and the template view 670 may be on separate screens that the user may navigate to for instance by navigating the mobile computing screen from one view to another view (e.g., by swiping a touch screen).

Figure 2:
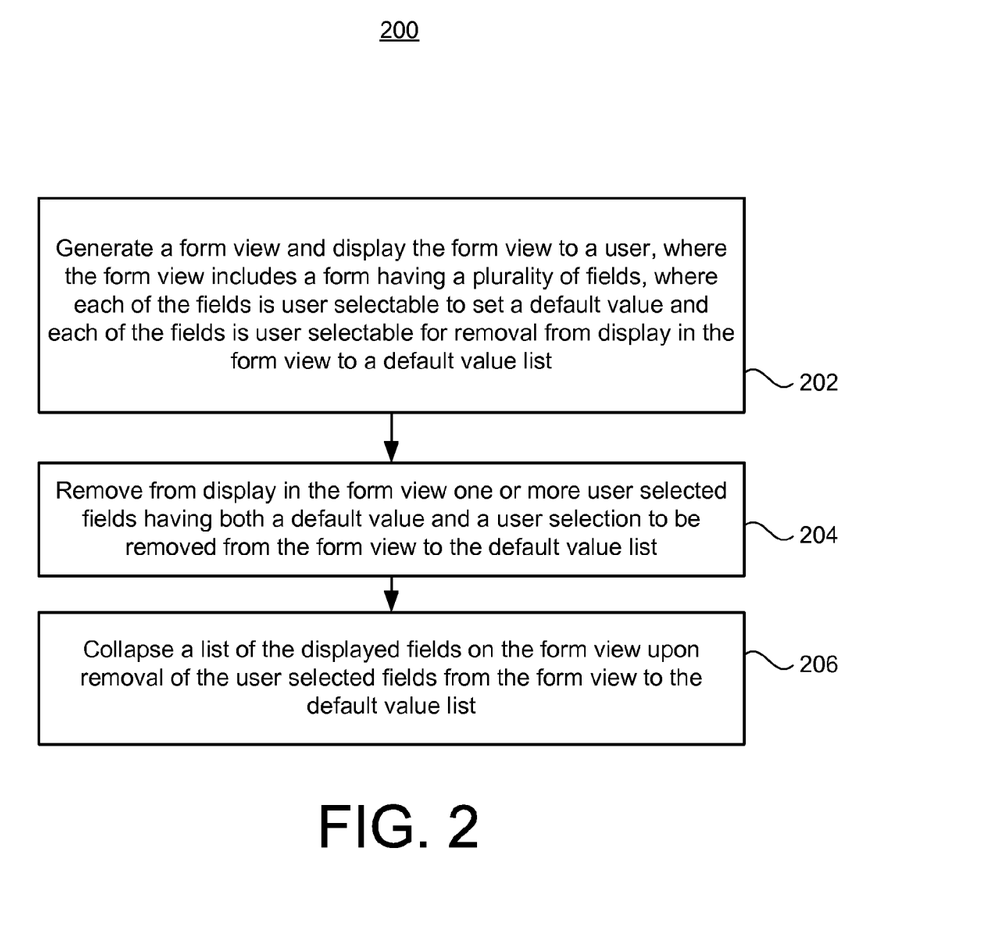
FIG. 2 is a flowchart illustrating example operations of the system of FIG. 1.

Referring to FIG. 2, an example flowchart illustrates a process 200, which include example operations of the system of FIG. 1. The process 200 includes generating a form view and displaying the form view to a user, where the form view includes a form having multiple fields, where each of the fields is user selectable to set a default value and each of the fields is user selectable for removal from display in the form view to a default value list (202). For example, with reference to FIG. 1, the form module 114 and the display module 118 may use the processor 104 to generate and display a form view, such as the form view illustrated by screen shot 300 of FIG. 3.

Process 200 also includes removing from display in the form view one or more user selected fields having both a default value and a user selection to be removed from the form view to the default value list (204). For example, in response to receiving a user selection to set a default value and to remove one or more fields from the form view, the form module 114, the display module 118 and the default value module 116 may use the processor 104 of FIG. 1 to remove from display in the form view the selected field to the default value list. The removed field may be moved from the form view to the default value list.

Process 200 also includes collapsing a list of the displayed fields on the form view upon removal of the user selected fields from the form view to the default value list (206). For example, the display module 118 may use the processor 104 of FIG. 1 to collapse the list of the displayed fields on the form view upon removal of the user selected fields from the form view to the default value list.

Process 200 may optionally include saving the form view as a template, where the template includes the form view and the default value list.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for data entry, the system comprising:
   at least one processor;
   at least one memory, wherein the at least one memory is operably coupled to the at least one processor;
   a form module, wherein the form module comprises at least one form having a plurality of fields and the form module is configured to use the at least one processor to receive data into the fields and each of the fields is user selectable to set a default value and each of the fields is user selectable for removal from display in a form view;
   a default value module, wherein the default value module comprises a default value list and the default value list comprises the user selected fields having both a default value and user selected for removal from display in the form view and wherein each of the fields on the default value list is user selectable for return to the form view;
   a display module that is configured to use the at least one processor to display the form view, wherein the form view displays the plurality of fields for data entry and collapses the list of displayed fields to remove the fields on the default value list from display in the form view; and
   a template module that is configured to use the at least one processor to save the form view as a template in the at least one memory, wherein the template includes the form view and the default value list.

2. The system of claim 1 wherein the display module is configured to use the at least one processor to display the form view on a single screen.

3. The system of claim 1 wherein the display module is configured to use the at least one processor to display a default value view, wherein the default value view comprises the default value list.

4. The system of claim 3 wherein the display module is configured to use the at least one processor to display both the form view and the default value view on a same display.

5. The system of claim 3 wherein the display module is configured to use the at least one processor to display a template view, wherein the template view comprises a list of saved templates.

6. The system of claim 5 wherein the display module is configured to use the at least one processor to display the template view, the form view and the default value view on the same display.

7. The system of claim 1 wherein a field selected for return to the form view is inserted in the form view in a same location the field was in prior to removal from display in the form view.

8. The system of claim 1 wherein the at least one processor is part of a mobile computing device.

9. A computer-implemented method for executing instructions stored on a non-transitory computer readable storage medium, the method comprising:
generating a form view and displaying the form view to a user, wherein the form view includes a form having a plurality of fields, wherein each of the fields is user selectable to set a default value and each of the fields is user selectable for removal from display in the form view to a default value list;
removing from display in the form view one or more user selected fields having both a default value and a user selection to be removed from the form view to the default value list wherein each of the fields on the default value list is user selectable for return to the form view; and
collapsing a list of the displayed fields on the form view upon removal of the user selected fields from the form view to the default value list.

10. The method as in claim 9 further comprising saving the form view as a template, wherein the template includes the form view and the default value list.

11. The method as in claim 9 wherein generating the form view and displaying the form view comprises displaying the form view on a single screen.

12. The method as in claim 9 further comprising generating and displaying a default value view, wherein the default value view includes the default value list.

13. The method as in claim 12 further comprising displaying the form view and the default value view on a same display.

14. The method as in claim 9 further comprising:
receiving a user selection of a field on the default value list for return to the form view; and
inserting the selected field in the form view in a same location the field was in prior to removal from the form view.

15. A computer program product, the computer program product being tangibly embodied on a non-transitory computer-readable storage medium and comprising instructions that, when executed by at least one computing device, are configured to cause the at least one computing device to:
generate a form view and display the form view to a user, wherein the form view includes a form having a plurality of fields, where each of the fields is user selectable to set a default value and each of the fields is user selectable for removal from display in the form view to a default value list;
remove from display in the form view one or more user selected fields having both a default value and a user selection to be removed from the form view to the default value list, wherein each of the fields on the default value list is user selectable for return to the form view; and
collapse a list of the displayed fields on the form view upon removal of the user selected fields from the form view to the default value list.

16. The computer program product of claim 15 further comprising instructions that, when executed, cause the at least one computing device to save the form view as a template, wherein the template includes the form view and the default value list.

17. The computer program product of claim 15 wherein the instructions that, when executed, cause the at least one computing device to generate the form view and to display the form view comprise instructions that, when executed, cause the at least one computing device to display the form view on a single screen.

18. The computer program product of claim 15 further comprising instructions that, when executed, cause the at least one computing device to generate and display a default value view, wherein the default value view includes the default value list.

19. The computer program product of claim 15 further comprising instructions that, when executed, cause the at least one computing device to display the form view and the default value view on a same display.

* * * * *